US010592980B1

(12) United States Patent
Deng et al.

(10) Patent No.: US 10,592,980 B1
(45) Date of Patent: Mar. 17, 2020

(54) SYSTEMS METHODS AND COMPUTER PROGRAM PRODUCTS FOR IDENTIFYING FINANCIAL ACCOUNTS UTILIZED FOR BUSINESS PURPOSES

(71) Applicant: Intuit Inc., Mountain View, CA (US)

(72) Inventors: Houtao Deng, Sunnyvale, CA (US); George Roumeliotis, Menlo Park, CA (US)

(73) Assignee: INTUIT INC., Mountain View, CA (US)

(*) Notice: Subject to any disclaimer, the term of this patent is extended or adjusted under 35 U.S.C. 154(b) by 89 days.

(21) Appl. No.: 13/839,705

(22) Filed: Mar. 15, 2013

(51) Int. Cl.
*G06Q 40/02* (2012.01)

(52) U.S. Cl.
CPC .................... *G06Q 40/02* (2013.01)

(58) Field of Classification Search
CPC ..... G06Q 20/405; G06Q 40/12; G06Q 40/123
See application file for complete search history.

(56) References Cited

U.S. PATENT DOCUMENTS

| | | | |
|---|---|---|---|
| 5,687,384 A | 11/1997 | Nagase | |
| 6,836,768 B1 | 12/2004 | Hirsch | |
| 6,886,115 B2 | 4/2005 | Kondoh et al. | |
| 6,910,003 B1 | 6/2005 | Arnold et al. | |
| 7,533,081 B2 | 5/2009 | De Lury et al. | |
| 7,587,672 B2 | 9/2009 | Wolf | |
| 7,870,016 B2 | 1/2011 | Fazal et al. | |
| 7,905,396 B2 | 3/2011 | Tidwell et al. | |
| 8,010,454 B2 | 8/2011 | Engel et al. | |
| 8,166,033 B2 | 4/2012 | Kazi et al. | |
| 8,195,133 B2 | 6/2012 | Ramer et al. | |
| 8,285,745 B2* | 10/2012 | Li | G06O 30/02 707/776 |
| 8,341,081 B1* | 12/2012 | Wang | G06Q 40/02 705/39 |
| 8,538,812 B2 | 9/2013 | Ramer et al. | |
| 8,600,974 B2 | 12/2013 | Rhoads et al. | |
| 8,612,208 B2 | 12/2013 | Cooper et al. | |
| 8,630,989 B2 | 1/2014 | Blohm et al. | |
| 8,645,405 B2 | 2/2014 | Chang et al. | |
| 8,880,430 B1 | 11/2014 | Wang et al. | |
| 2004/0024739 A1 | 2/2004 | Copperman et al. | |
| 2007/0061244 A1 | 3/2007 | Ramer et al. | |

(Continued)

OTHER PUBLICATIONS

Non-Final Office Action dated Mar. 28, 2014 in U.S. Appl. No. 13/725,719, filed Dec. 21, 2012 (9pages).

(Continued)

*Primary Examiner* — Talia F Crawley
(74) *Attorney, Agent, or Firm* — DLA Piper LLP (US)

(57) ABSTRACT

Computer-implemented methods, articles of manufacture and systems for identifying an on-line bank account that is a business account or utilized for business purposes. Keywords are determined and comparisons are performed with different types of financial account data and data from different resources. Comparison results are embodied within a data set that is generated and provided as an input to a rule generator such as a rule-based classifier. The rule-based classifier outputs a rule utilized to determine whether an account is a business account or utilized for business purposes, in contrast to a personal account utilize for non-business, personal or residential matters.

27 Claims, 16 Drawing Sheets

102 — Identify / receive business account keywords

104 — Generate account analysis rules

106 — Determine which financial accounts are business accounts or utilized for business purposes using generated rule

(56) References Cited

U.S. PATENT DOCUMENTS

| | | | |
|---|---|---|---|
| 2007/0061247 A1 | 3/2007 | Ramer et al. | |
| 2007/0168354 A1 | 7/2007 | Ramer et al. | |
| 2008/0208735 A1* | 8/2008 | Balet | G06Q 20/10 705/39 |
| 2009/0063461 A1* | 3/2009 | Wang | G06Q 30/02 |
| 2009/0300006 A1* | 12/2009 | Bose Rantham Prabhakara | G06F 16/316 |
| 2012/0130705 A1 | 5/2012 | Sun et al. | |
| 2013/0046661 A1* | 2/2013 | Levin | G06Q 40/02 705/30 |
| 2013/0054463 A1* | 2/2013 | Olson | G06O 30/06 705/44 |

OTHER PUBLICATIONS

Response to Non-Final Office dated May 12, 2014 in U.S. Appl. No. 13/725,719, filed Dec. 21, 2012 (17pages).

Notice of Allowance dated Jul. 14, 2014 in U.S. Appl. No. 13/725,719, filed Dec. 21, 2012 (9pages).

Melanson, Judy, Customer loyalty: There's a Lot More to Data Than Just a List of Names and Numers, Financial Services Marketing, New York: Nov./Dec. 2000, vol. 2, Iss. 8; p. 62.

Greenwood, George, What if your name was stolen ?; Personal Information, Langley Advance, Langley, B.C.: Feb. 10, 2009, p. B.6.

Notice of Allowance dated Aug. 17, 2012, Amendment after Notice of Allowance dated Nov. 16, 2012 and Amendment After Final dated Nov. 27, 2012 in U.S. Appl. No. 13/192,453, filed Jul. 27, 2011, U.S. Pat. No. 8,341,081.

Greenwood, George, What if your name was stoen?; Personal Information, Langley Advance, Langley, B.C.: Feb. 10, 2009, p. B.6.

Melanson, Judy, Customer loyalty: There's a Lot More to Data Than Just a List of Names and Numbers, Financial Services Marketing, New York: Nov./Dec. 2000, vol. 2, Iss. 8; p. 62.

* cited by examiner

Fig. 6A (Input 1 – Financial Account Data)

Fig. 6B (Resource Input 2 - Financial Management System Data)
| FMS ID (611) | E-Mail (612) |
|---|---|
| 1 | bayareac@gmail.com |
| 2 | cons1234@yahoo.com |
| 3 | famflower@att.com |
| 4 | sunflower@att.com |
| 5 | happyflower@yahoo.com |
Fig. 6C (Resource Input 3 - Business Directory Data)
| Business Directory ID (621) | Address (622) |
|---|---|
| 1 | A Street 123 |
| 2 | B Street 125 |
| 3 | C Street 123 |

Fig. 7 (Match Table)

| Account Names (801) | Selected Account Name / Matched? (802) |
|---|---|
| Robert Smith | Y |
| Robert Williams | Y |
| Sunnyvale Construction, Inc | Y |
| Robert Davis | N |
| LINDA MILLER | N |
| Bay area Construction, Inc | Y |
| Construction, Inc | Y |
| Famous Flower | Y |
| Sunnyvale Flower | Y |
| Tom | Y |

Fig. 8A (Selected Account Names With Matches) (Before Threshold)

800

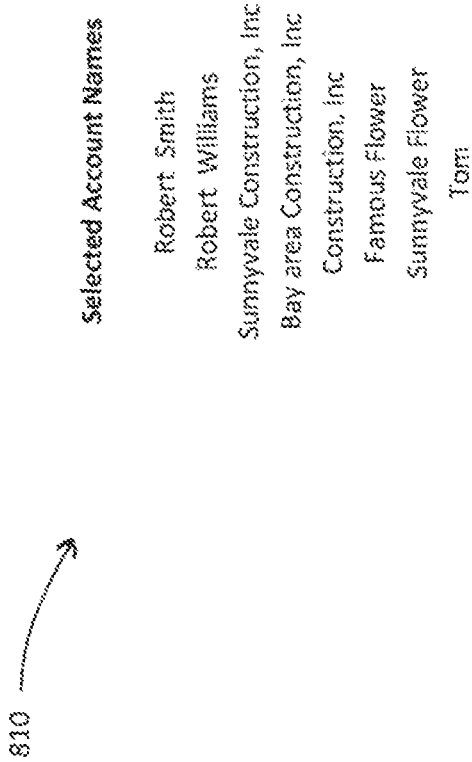
Fig. 9B (Selected Account Names With Matches) (Before Threshold)

Fig. 9 (Segment Threshold Satisfaction)

| ID (1101) | Account Data and Input 2 Match? Flag_match/input2 (1102) | Account Data and Input 3 Match? flag_match_input3 (1103) | Account Name Contain Keyword? flag_contain_business_keyword (1104) |
|---|---|---|---|
| 1 | No | Yes | No |
| 2 | No | Yes | No |
| 3 | No | Yes | Yes |
| 4 | No | No | No |
| 5 | No | No | No |
| 6 | Yes | No | Yes |
| 7 | Yes | No | Yes |
| 8 | Yes | No | Yes |
| 9 | Yes | No | Yes |
| 10 | Yes | No | No |

1100

Fig. 11 (Generated Data Set / Flag Table)

Fig. 14 (Result of Application of Generated Rule)

US 10,592,980 B1

SYSTEMS METHODS AND COMPUTER PROGRAM PRODUCTS FOR IDENTIFYING FINANCIAL ACCOUNTS UTILIZED FOR BUSINESS PURPOSES

BACKGROUND

Embodiments relate to analysis of electronic data such as data of an on-line bank account hosted by a financial institution. On-line banking is very popular, and millions of users manage their accounts utilizing on-line banking There are many times when an account is opened but then utilized for business or both personal and business purposes. Account holders, however, may not indicate that the account is a business account or that the account is utilized for business purposes, and account names often are or relate to the account holder's personal name rather than a business of the account holder. Further, account names provided by account holders, such as when accounts are initially opened, may be familiar to the users, but may be incomplete or include a short and often ill-formed text descriptions such that even when it is intended to identify or describe a business, the ill-formed text description may not permit such identification to others besides the account holder. These issues make it difficult to determine the meaning of an account name, and even more difficult to determine whether an account so named is a business account used for business purposes.

Financial institutions often treat users that conduct only personal transactions and other users that conduct business, or business and personal transactions indifferently since they are unable to differentiate these different accounts and account holders. Consequently, many account holders that have business accounts or that utilize accounts for business may miss out on offerings or opportunities offered by the financial institution to businesses. It is estimated that the number of such users is on the order of millions. These millions of account holders may not know about and may not receive the benefits of additional business-related account services, software programs or offerings, and support or promotions related to their business activities and that are available to them. Likewise, financial institutions miss out on opportunities to better serve their customers and satisfy customer needs, enhance customer experiences and loyalty to the financial institution, and the opportunity to cross-sell the customer to other products or services. Thus, the inability to identify accounts that are utilized for business purposes can have a significant impact on services provided to account holders and account holder opinions of the services they receive from a financial institution.

SUMMARY

Embodiments are directed to data-driven methods that leverage text analytics, machine learning and multiple data sources to identify business accounts or accounts used for business purposes, which are distinguished from personal accounts and personal accounts utilized only for personal, non-business purposes (e.g., paying personal bills such as personal rent, utilities, phone bills, an employee receiving an electronic paycheck deposit).

Certain embodiments are directed an intermediate computer that is in communication with a financial institution computer, a user computer and hosts or is communication with one or more data resources identifying business accounts or accounts used for business purposes.

Certain embodiments are directed to determining keywords of account data being analyzed that are indicative of a business or business account. Embodiments are also directed to determining a set of keywords that are associated with business accounts by analyzing account data relative to multiple different sources.

Certain embodiments are directed to generating rules that are used to identify accounts that are business accounts or utilized for business purposes. Rules may be generated by a rule generator in the form of a rule-based classifier. Certain embodiments are also directed to generation of a data set utilized by a rule generator. According to certain embodiments, the data set reflects results of multiple comparisons involving account data and whether a segment of an account name includes a keyword.

Certain embodiments are directed to identifying keywords utilizing multiple account data comparisons. Account data comparisons may be multi-dimensional in that they involve different types of account data (e.g., account name, electronic mail address and mailing address comparisons).

For example, one embodiment is directed to a computer-implemented method for determining whether financial accounts of respective account holders hosted by a financial institution are business accounts or utilized for business purposes and comprises identifying keywords associated with business accounts and generating a data set. The data set comprises respective indicators of whether respective financial account data includes an identified keyword, and respective indicators of results of respective comparisons involving respective financial account data. The method further comprises the computer applying a rule generator to the data set. The rule generator outputs one or more rules utilized to determine a result of whether a financial account is a business account or utilized for business purposes.

Yet another embodiment is directed to a computer-implemented method for determining whether financial accounts of respective account holders hosted by a financial institution are business accounts or are utilized for business purposes and comprises identifying keywords associated with business accounts and generating a data set. The data set includes multiple indicators. Certain indicators indicate whether financial account data of a first type (e.g., account name) includes an identified keyword. Other indicators indicate results of respective comparisons involving financial account data of a second type different than the first type. The method further comprises applying a rule generator to the data set that was generated. The rule generator outputs a rule. The rule is utilized to determine which financial accounts are business accounts or utilized for business purposes.

A further embodiment is directed to a computer-implemented method for determining whether financial accounts of respective account holders hosted by a financial institution are business accounts or are utilized for business purposes and comprises identifying keywords associated with business accounts. Keywords are identified by receiving financial account data, data of a first resource managed by a first host other than the financial institution and data of a second resource managed by a second host other than the financial institution and different than the first resource. Keyword identification further comprises comparing financial account data and the first resource data, comparing financial account data and the second resource data, selecting account names based at least in part upon the comparisons, identifying account name segments, determining respective segment frequencies within the account names, comparing the segment frequency and pre-determined minimum segment frequency, and selecting a segment as a keyword based at least in part upon the comparison. The method further comprises generating a data set. The data set comprises respective indicators of whether respective financial account data of a first type includes an identified keyword. The indicators also indicate respective results of respective comparisons involving respective financial account data of a second type different than the first type. A rule generator is applied to the data set and outputs a rule. The rule is utilized to determine which financial accounts are business accounts or utilized for business purposes.

Method embodiments may be executed by a financial institution computer and/or by an intermediate computer in communication with the financial institution computer and a user or account holder computer. Thus, a financial institution may analyze its own accounts, or an intermediate computer may perform this method for one or multiple financial institutions.

Additional embodiments are directed to a non-transitory computer readable medium tangibly embodying one or more sequences of instructions wherein execution of the one or more sequences of instructions by one or more processors contained in one or more computing systems causes the one or more computing systems to determine whether financial accounts that respective account holders have at a financial institution are business accounts or are utilized for business purposes according to the method embodiments.

Further embodiments are directed to systems configured to execute embodiments. System embodiments may include one or multiple computers. For example, one system embodiment comprises an intermediate computer in communication with the financial institution computer and a user or account holder computer configured to execute embodiments.

In a single or multiple embodiments, identifying keywords involves receiving respective account names, parsing the account names into segments, and analyzing or comparing segments relative to at least one resource, which is not managed by the financial institution. At least one account name segment is selected as a keyword based at least in part upon the analysis or comparison. For example, keyword identification may involve receiving financial account data, data of a first resource and data of a second resource different than the first resource. The method further comprises comparing the financial account data and the first resource data to determine whether financial account data matches the first resource data and comparing financial account data and the second resource data to determine whether financial account data matches the second resource data. The method further comprises selecting account names of financial account data. The account names selected are those having financial account data (e.g., other than account names) matching data of at least one of the first and second resources. At least one segment of an account name is selected as a keyword.

In a single or multiple embodiments, keyword identification comprises receiving financial account data, data of a financial management system managed by a host other than the financial institution, and data of a business directory. The method further comprises multiple comparisons involving the financial account data. A first comparison involves financial account data and the financial management system data to determine whether financial account data matches the financial management system data. A second comparison involves comparing financial account data and the business directory data to determine whether financial account data matches business directory data. Additional comparisons may be performed depending on the number of data resources and/or data types being analyzed. Financial account data comprising account names of accounts having financial data matching data of at least one of the first and second resources are selected and parsed into segments. At least one segment of each selected account name as a keyword.

In a single or multiple embodiments, financial account data involved in comparisons includes an account name, an electronic mail address of the account holder and an address of the account holder. Data resources involved in comparisons include financial management system data such as respective electronic mail addresses of respective registered users of the financial management system. An example of a financial management system is a business accounting software program. Another data resource may be a business directory data, which includes, for example, respective addresses of business entities included in the business directory.

In a single or multiple embodiments, account name segments selected as keywords are selected depending on how many times or the frequency of occurrence of those segments within the account names being analyzed. In one embodiment, the segments must occur with a pre-determined frequency (e.g., in at least 20% of account names being analyzed). Segments satisfying that criteria are selected as keywords.

In a single or multiple embodiments, rules that are utilized to identify business accounts or accounts utilized for business purposes are generated, and the rule generator may be a rule-based classifier that is applied to a data set including predictor variables and a class variable.

In a single or multiple embodiments, a financial account is identified as a business account or utilized for business purposes when the third indicator indicates that the account data includes a keyword associated with business accounts, else when this is not the case, the financial account is identified as a business account or utilized for business purposes at least one of the first and second indicators indicates a match, whereas an a financial account is not so identified when the third indicator does not indicate that the account data includes a keyword associated with business accounts and neither the first indicator nor the second indicator indicates a match.

In a single or multiple embodiments comparisons performed for determining a match may involve contact information of the account holder provided by the financial institution and received from a different source. Contact information may be an electronic mail address, mailing or post office box address or a telephone number, cellular telephone number or facsimile number. Other unique identification or location data may also be utilized.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 6A is a table illustrating examples of types of financial account data including account names, FIG. 6B is a table illustrating examples of types of financial management system data including electronic mail addresses of registered users of the financial management system, and FIG. 6C is a table illustrating examples of types of business directory data including mailing address data of businesses included in the directory;

FIG. 7 is a table illustrating results of comparisons involving financial account data and resource data;

FIG. 8A is a table based on the table shown in FIG. 7 showing account names and comparison results, FIG. 8B is a table including selected account names following comparisons involving financial account data;

FIG. 9 is a table illustrating whether segments of selected account names satisfy pre-determined criteria to qualify for selection as a business keyword;

FIG. 11 is a table illustrating an example of a data set or flag table generated according to embodiments;

DETAILED DESCRIPTION OF ILLUSTRATED EMBODIMENTS

Embodiments relate to analyzing accounts such as on-line bank accounts at a financial institution in order to determine whether an account is a business account or utilized for business purposes (in contrast to a personal account utilized for personal purposes). Embodiments can determine keywords associated with businesses and business accounts and/or generate rules utilizing a rule engine to automatically identify an account that is a business account or utilized for business purposes. With knowledge of which accounts are business accounts or used for business purposes, financial institutions can better serve their customers and present account cross-selling offers, opportunities or services that may be relevant to their business activities.

Figure 1:
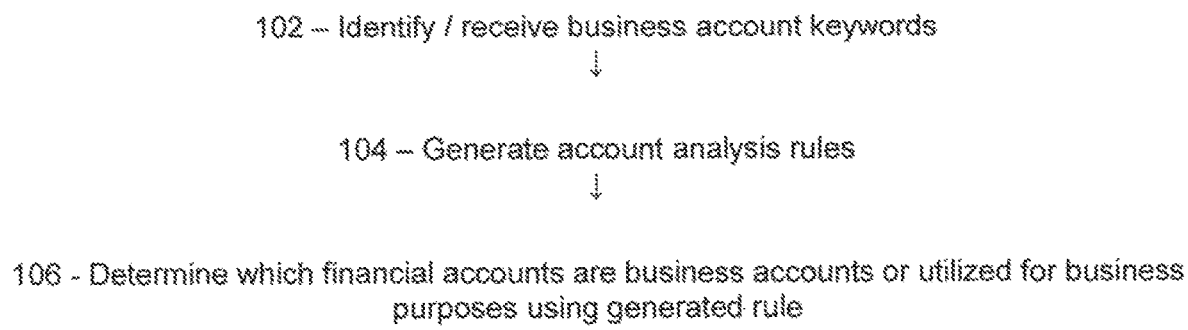
FIG. 1 is a flow diagram of one embodiment of a method for discovering or identifying on-line bank accounts that are business accounts or utilized for business purposes.

Referring to FIG. 1, in a method according to one embodiment, keywords of or associated with a business account are identified, determined or received at 102. At 104, rules that are utilized to analyze accounts are generated. At 106, the rules are applied to determine which financial accounts are business accounts or utilized for business purposes using a generated rule.

Figure 2:
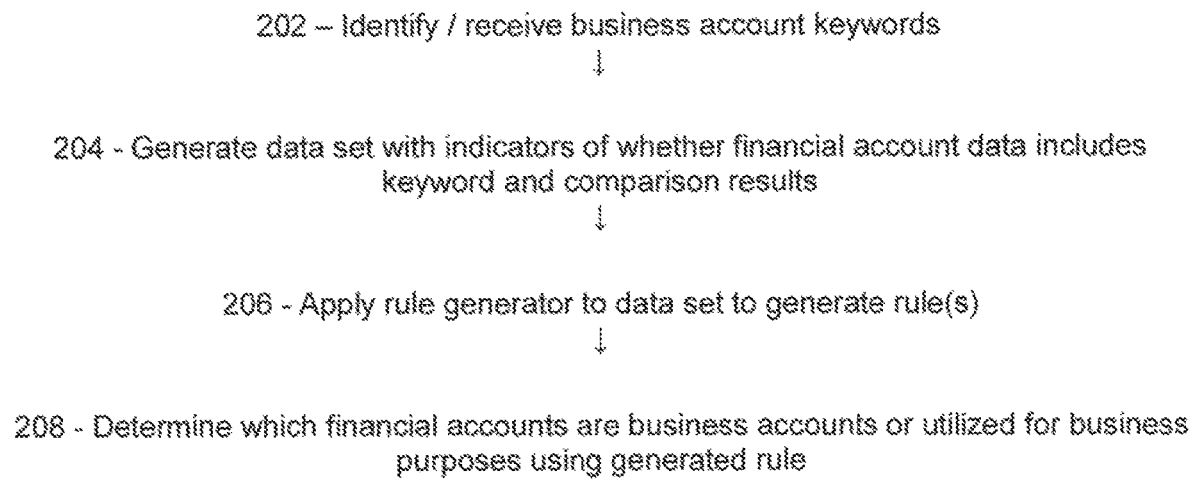
FIG. 2 is a flow diagram of one embodiment of a method for discovering or identifying on-line bank accounts that are business accounts or utilized for business or both personal and business purposes involving generation of a data set to be utilized for to generate rules utilized to identify business accounts or accounts utilized for business purposes.

Referring to FIG. 2, a method according to one embodiment involves, at 202, identifying, determining or receiving business account keywords, and at 204, generating a data set including indicators or flags of whether financial account data includes a keyword and for results of comparisons involving financial account data. At 206, rules are that are utilized to analyze accounts received, or generated, e.g., by utilizing a rule-based classifier, and at 208, a received or generated rule is applied to determine which financial accounts are business accounts or utilized for business purposes using the received or generated rule.

With embodiments, accounts that are determined to be accounts of businesses, business owners or utilized for business purposes can be identified by the financial institution hosting the account, or by a third party that informs the financial institution of these business-related accounts. Embodiments are capable of identifying accounts that were opened or identified with a personal or individual's name rather than a business or corporate name. Thus, embodiments present business opportunities for cross-selling or more targeted offerings of other products or services to account holders that utilize accounts for business purposes, even when the account holder's account does not identify a business. For example, financial institutions may provide more incentives to identified business customers to remain at their current financial institution rather than opening another account at a different financial institution or offer business-related loan products or other financial services, which are not offered to individual account holders. Embodiments and aspects thereof are in further detail with reference to FIGS. 3-15.

Figure 3:
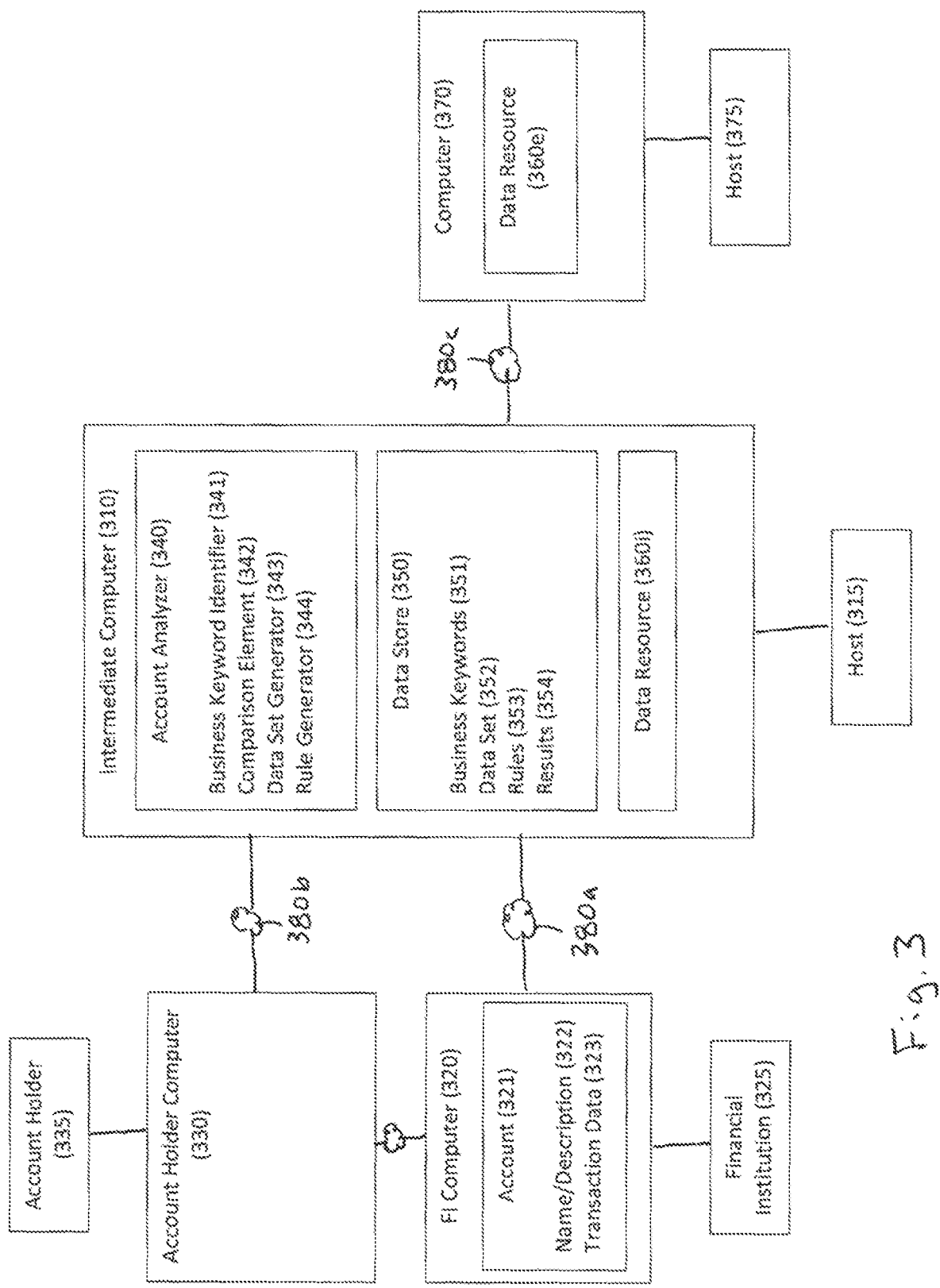
FIG. 3 is a block diagram of one embodiment of a system configured for discovering or identifying on-line bank accounts that are business accounts or utilized for business purposes.

Referring to FIG. 3, a system configured or operable to determine whether an on-line bank account 321 is a business account or utilized for business purposes comprise or involves a computer 310 managed by a host 315 and a computer 320 of a financial institution 325 (generally, FI 325 as shown in FIG. 3) that manages accounts 321 of respective users, customers or account holders (generally, "account holder" 335). Accounts 321 may be savings, checking, money market, credit card and other types of accounts with associated account data (such as balances), account names or descriptions 322 (generally, account names) and account transaction data or histories 323 (such as completed or pending deposits, withdraws, electronic bill payments). The account name 322, for example, may be the name or description on the account when the account 321 was opened, e.g., an individual's name with authority to make deposits to and payments from the account 321. The account 321 may be a business account or utilized for business purposes, but may include an individual's name 322. For ease of explanation, reference is made to an account 321 and an account name 322.

In the illustrated embodiment, account holders 335 may utilize their computers 330 to access an on-line account 321 by communicating with the FI computer 320. In other system configurations, as shown in FIG. 3, the host 315 may offer on-line banking services such that the account holder 335 accesses the account 321 hosted by the FI 320 through the host or intermediate computer 310 (generally, intermediate computer 210). One example of a host 315 that offers such services Intuit Financial Services (IFS), of Intuit Inc., Mountain View, Calif. For this purpose, the account holder 335 may utilize a computer 330 such as a desktop or laptop computer, a tablet computing device, a smartphone or other mobile or computing device capable of communicating with the intermediate computer 310 and/or FI computer 320 through respective networks, and may utilize a browser to navigate screens presented to view and manage account 321.

The intermediate computer 310 hosts or accesses an account analyzer 340 according to embodiments. As shown in FIG. 3, in the illustrated embodiment, the account analyzer 340 includes components or modules of a keyword identifier 341, comparison or match element 342, a data set generator 343 and a rule generator 344. As described in further detail below, the account analyzer 340 receives financial account data such as account names 322 from the FI computer 320 and analyzes the account names 322 according to embodiments to determine which accounts 321 are business accounts or utilized for business purposes.

The intermediate computer 310 also hosts or accesses a data store or database 350, which may include received data, analyzed data, data utilized for analysis, and/or generated results such as account name 322 data received from the FI 325, generated or received keywords 351 associated with a business or business activities, which are received or accessed from an existing keyword database (not shown in FIG. 3), a data set 352 generated according to embodiments for use in generating rules 353 and rule analysis, rules 353 that are received or specified (e.g., by an administrator), and/or generated according to embodiments, and the rule results our outputs 354.

FIG. 3 also illustrates that the intermediate computer 310 may host one or more data resources 360i (internal data resource) and/or access one or more external data resources 360e (external data resource) of another computer 370 and host 375. While FIG. 3 illustrates one internal data resource 360i and one external data resource 360e, it will be understood that embodiments may involve multiple internal and/or external data resources 360, and that FIG. 3 is provided to generally illustrate how system embodiments may be configured.

For example, internal data resources 360i, e.g., resources of host Intuit Inc., may include one or more of QUICK-BOOKS financial management system or business accounting program (on-line and desktop), Intuit Business Directory, Graphite database, which is a database including business customers of Intuit Inc. such as QUICKBOOKS on-line and QUICKBOOKS desktop business accounting programs, NETEZZA data warehousing system, which may include data of systems or databases such as QUICK-BOOKS business accounting programs and Graphite database, and DemandFource, which is develops software-as-a-service applications designed to help customers to grow revenue, foster returning clients and provide for operation management. QUICKBOOKS is a registered trademark of Intuit Inc. NETEZZA is a registered trademark of Netezza Corporation, Framingham, Mass.

One or more of these internal data resources 360i or databases may include information about a registered user, customer or account holder such as company identification, company name, owner, telephone number, mailing or post office box address, electronic mail address, facsimile number, industry type, number of employees, number of customers, number of transactions, etc. Thus, the account holder 335 may or may not also be a registered user of the host 315 offerings. For example, while the host 315 may offer a financial management system (FMS) such as QUICKBOOKS business accounting program, the account holder 335 may or may not be a registered user of that program.

Examples of external data resources 360e include government or business databases or directories such as the U.S. Census Bureau, Data.gov, WordNet, DUN & BRAD-STREET business directory). DUN & BRADSTREET is a registered trademark of Dun & Bradstreet Corporation, Short Hills, N.J. For ease of explanation, reference is made generally to a data resource 360, but it will be understood that embodiments may involve one or more data resources 360 managed by one or more hosts 315 and 375, and that different or heterogeneous data resources 360 may be accessed according to embodiments.

For purposes of communication between system components, the intermediate computer 310 is operably coupled to or in communication with the FI computer 320, account holder computer 330 and one or more other computers 370 as necessary through respective network 380a-c (generally, network 380). Examples of networks 380 and other networks discussed herein that may be utilized for communications between system components include but are not limited to a Local Area Network (LAN), a Wide Area Network (WAN), Metropolitan Area Network (MAN), a wireless network, other suitable networks capable of transmitting data, and a combination one or more or other networks. For ease of explanation, reference is made to a network 380 generally, but various networks, combinations of networks and communication systems, methods and protocols may be utilized.

Figure 4:
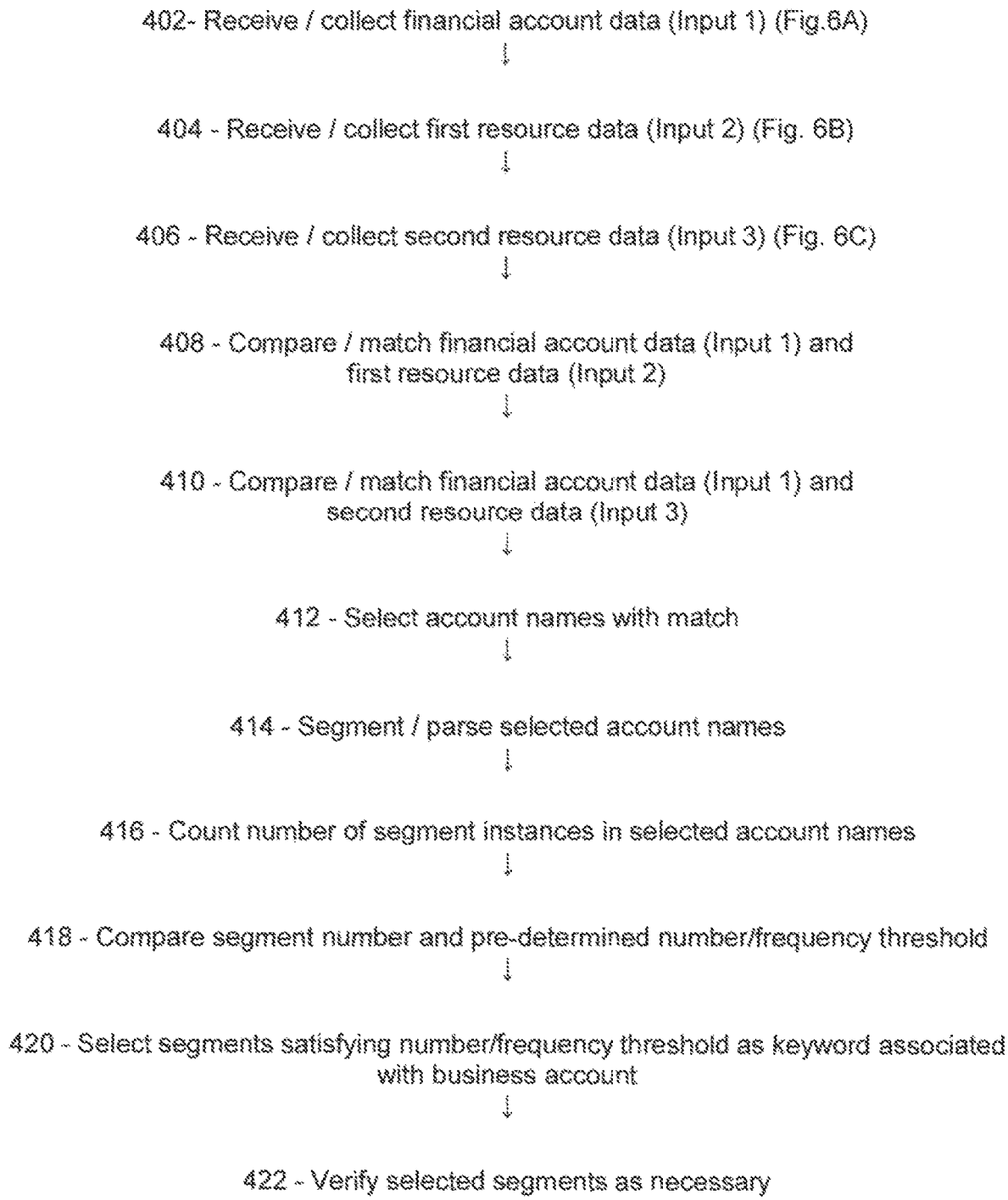
FIG. 4 is a flow diagram of a method for comparing financial account data with data of resources and determining or identifying keywords according to certain embodiments.
Figure 5:
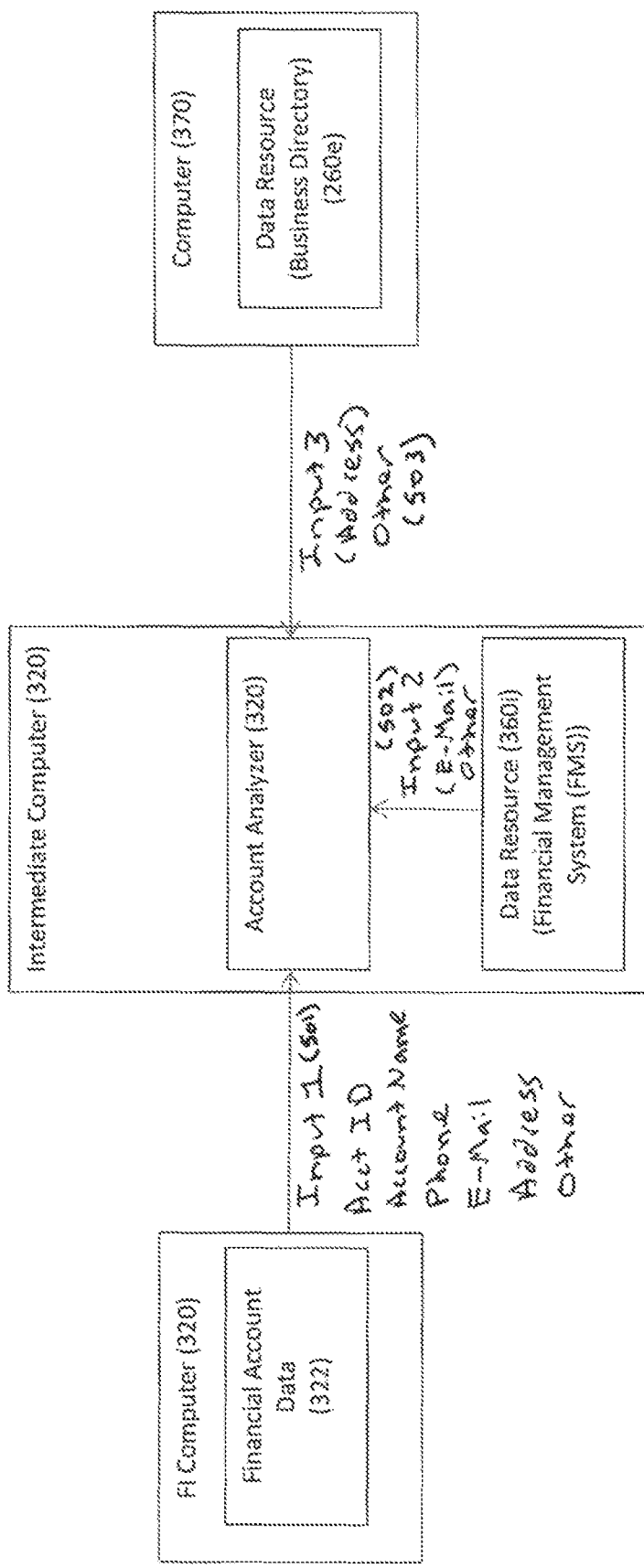
FIG. 5 illustrates one example of embodiments in which an account analyzer receives financial account data, financial management system data and business directory data.

Referring to FIGS. 4-5, in a method according to one embodiment, the account analyzer 340 of the intermediate computer 310 receives or collects data from heterogeneous data resources 360, and at 402, receives or collects financial account data from the FI computer 320 at 402. Reference is made to financial account data being received or collected by account analyzer 340 or keyword identifier 341 thereof. While embodiments are described from the perspective of the intermediate computer 310 executing embodiments in order to analyze account data of a FI 325, embodiments may also be executed by the FI computer 320 for analysis of its own accounts 321. Moreover, while FIG. 2 illustrates a single FI 325 and single account holder 335, it will be understood that embodiments may involve other numbers of FIs 325 and account holders 335, e.g., hundreds and thousands of FIs 325 and/or account holders 335. Thus, for example, the intermediate computer 310 may analyze accounts of one or multiple FIs.

In the illustrated example shown in FIG. 5, the financial account data 501 (identified as Input 1) received from the FI computer 320 includes financial account data, examples of which include one or more of Account ID, Account Name, Phone Number, electronic mail address and mailing address. For purpose of explanation with reference to other figures, this data is generally referred to as Input 1. While various examples of account data are listed above, embodiments may involve different types and combinations of account data. Thus, the types of data for Input 1 are provided as non-limiting examples for purposes of explanation.

With continuing reference to FIGS. 4-5, at 404-406, the account analyzer 340 receives or collects data from one or more internal and/or external data resources 360 and other than account data hosted by the FI computer 320. In the illustrated embodiment shown in FIG. 5, the account analyzer 340 receives data from one internal data resource 360i and one external data resource 360e. As one example to demonstrate how embodiments may be implemented, reference is made to receiving data (Input 2) from the internal data resource 360*i* such as QUICKBOOKS business accounting program, and receiving data (Input 3) from an external data resource 360*e* such as DUN & BRADSTREET business directory. In the examples provided for purposes of explanation, not limitation, Input 2 includes data such as an electronic mail address 502, and Input 3 includes data such as mailing addresses 503 of businesses within the business directory. While various examples of Input 2 and Input 3 data are listed above, embodiments may involve different types and combinations of data. Thus, the types of data for Inputs 2 and 3 are provided as non-limiting examples for purposes of explanation.

Further, while reference is made to internal and external data resources 360*i, e*, as shown in FIG. 3, such resources 360 may all be hosted by the intermediate computer 310, e.g., when the host 315 is a subscriber or customer of a data service provided by an external host 375.

FIGS. 6A-C provide more detailed examples of the types of data (Inputs 1-3, 501-503) received or collected. As shown in FIG. 6A, the illustrated simplified example involves 10 accounts. The table 600 includes data 501 of the 10 accounts and received financial account data (Input 1) in four columns 601-604: Account ID, Account Name, E-mail and Address. As shown in FIG. 6A, certain names (e.g., Robert Smith, Robert Williams, Robert Davis and Linda Miller) are names of individuals (no business name or information is provided).

FIG. 6B illustrates an example of the account analyzer 320 receiving data from a FMS such as QUICKBOOKS business accounting program in the form of electronic mail addresses of registered users of the QUICKBOOKS business accounting program. In the illustrated example, the account analyzer 320 has received data 502 in table 610 including two columns 611-612: FMS ID and E-mail. Thus, there is at least one common type or category of data in both tables 600 and 610, in this example, e-mail address.

FIG. 6C illustrates an example of the account analyzer 320 receiving data from a business directory database such as DUN & BRADSTREET business directory database, which includes business information (such as name and address) of businesses included in the directory. In the illustrated example, the account analyzer 320 has received data 503 in table 620 including two columns 621-622: Business Directory ID and Address. Thus, there is at least one common type or category of data in both tables 600 and 620, in this example, address such mailing address or P.O. Box address data.

Referring again to FIG. 4, at 408, the keyword identifier 341, or comparison or match element 342 thereof or in communication therewith, performs multiple comparisons involving different types of data received from the heterogeneous data resources 360 in order to determine whether financial account data (Input 1) 501 matches one or both of data (Inputs 2 and 3) 502, 503 of data resources 360.

More specifically, at 408, the comparison or match element 342 receives Input 1 and 2 501, 502 and compares data of these inputs to determine whether some or all of account data (Input 1) 501 matches some or all of received resource data (Input 2) 502, and at 410, the comparison or match element 342 also receives Input 3 503 and compares data of Input1 501 and Input 3 503 to determine whether some or all of account data (Input 1) matches some or all of received resource data (Input 3). In the illustrated simplified example, step 408 involves comparison of e-mail column 613 of Input 1 and e-mail column 622 of Input 2, and step 410 involves comparison of address column 614 (Input 1) and address column 632 (Input 3). At 412, the comparison or match element 342 (column 612 of Input 1) that have data matching data within the tables 620, 630 of Inputs 2 and 3.

FIG. 7 illustrates a table 700 reflecting the results generated by the comparison or match element 342 based on the tables 610, 620, 630 shown in FIGS. 6A-C. In the illustrated example, the table 700 includes columns 701-705 for Account ID, Account Name, E-mail, Address and "Match to" indicating whether there is a match involving financial account data 501 (Input 1), and if so, respective match data. In the illustrated example, the e-mail addresses of the FMS (FIG. 6B, Input 2) match respective e-mail addresses of accounts identified by Accounts ID 6-10, e.g., Account ID 6 has an e-mail address bayarea@gmail.com and this e-mail address is also in a file or record of a registered user associated with FMS ID 1. This matching result is reflected in the table 700 shown in FIG. 7 in the row identified by Account ID 6, and column 6 for that row indicating a match of "Input 2, Row 1" meaning that financial account data (Input 1) for Account ID 6 included an e-mail address that matched an e-mail address provided within the data (Input 2) received from the financial FMS.

As another example, the mailing addresses of the business directory (FIG. 6C, Input 3) match respective mailing addresses of accounts identified by Accounts ID 1-3, e.g., Account ID 1 has a mailing address of A Street 123 and this mailing address is also in a file or record of a business that is included in the business directory identified as Business Directory ID 1. This matching result is reflected in the table 700 shown in FIG. 7 in the row identified by Account ID 1, and the "Match to" column for that row indicating a match of "Input 3, Row 1" meaning that financial account data (Input 1) for Account ID 1 included a mailing address that matched a mailing address provided within the data (Input 3) received from the business directory.

In the illustrated example, there was no match for financial account data identified by Account IDs 4 and 5. In other words, the e-mail addresses Rdavis@hotmail.com and LinaaM@apple.com did not match any e-mail address received from the FMS, and the mailing addresses "D Street 126" and E Street 127" did not match any mailing addresses (Input 3) received from the business directory. Thus, the table indicates "NO MATCH" for these two accounts. The table 700 is populated with the result data such that a determination can be made regarding which account names 322 of the financial account data are associated with data that matched data received from at least one of the data resources 360.

Referring again to FIG. 4 and with further reference to FIGS. 8A-B, account names 322 having financial account data matching data of at least one data resource 360 as shown are selected (selected account name 322*s*). Thus, continuing with the above example, FIG. 8A is a table 800 based on the table 700 shown in FIG. 7 showing only the account names 322 and whether there was a match, and the table 810 shown in FIG. 8B shows only those account names 322*s* associated with financial account data matching data of at least one data resource 360 as being selected. Thus, of the 10 original account names 322, only eight of them are selected as shown in FIG. 8B (i.e., Robert Davis and Linda Miller are not selected since there was no match for these account names 322).

Referring again to FIG. 4 and with further reference to FIG. 9, at 414, the selected account names 322*s* are segmented or parsed into individual components or segments (generally, segments), and at 416, the keyword identifier 341 counts how many times a segment appears in the selected account names 322s. Continuing with the above example, referring to FIG. 9, the table 900 includes columns 901-903 for the segments of selected account names 322s, the number of times a particular segment appears within selected account names 322s, or the segment frequency 902, and whether the segment count or frequency satisfies pre-determined segment count or frequency 903. Thus, in the illustrated example, selected account name 322s Robert Smith is parsed into segments "Robert" (row 1 of table 900) and "Smith" (row 2 of table 900), and selected account name 322s Sunnyvale Construction, Inc. is parsed into segments "Sunnyvale" (row 4 of table 900), "Construction" (row 5 of table 900) and Inc (row 6 of table 900). This parsing process is applied to all of the selected account names 322s and the segment and segment count or segment frequency are summarized in columns 901 and 902.

For example, referring again to FIG. 8B, the following account names 322s were selected: Sunnyvale Construction, Inc; Bay Area Construction Inc and Construction, Inc. The "Construction" and "Inc" segments are identified as appearing in the selected account names 322s three times, whereas "Bay" and "Area" segments only appear in selected account names 322s one time. Similarly, as shown in FIG. 8B, the following account names 322s were also selected: Robert Smith and Robert Williams. The "Robert" segment is identified as appearing in the selected account names 322s two times, whereas "Smith" and "Williams" segments only appear in selected account names 322s one time.

The pre-determined threshold or frequency may be a minimum number of instances of a segment or minimum frequency relative to the number of selected account names 322s. According to one embodiment, the pre-determined minimum frequency is that a particular segment must appear in at least 20% of the selected account names 322s. Thus, continuing the prior example in the table shown in FIG. 9, in which eight of the ten selected account names 322 were selected, "Robert" appears twice in the eight selected account names 322s (2/8=25%), "Construction" appears three times in the eight selected account names 322s (3/8=37.5%), whereas "Bay" and "Area" appear only one time in the eight selected account names 322s (1/8=12.5%). Thus, using 20% as an exemplary threshold, only some of the segments satisfy the threshold, namely, Robert, Sunnyvale, Construction, Inc. and Flower, whereas the following segments did not satisfy the threshold: Smith, Williams, Bay, Area, Famous and Tom. It will be understood that while 20% is provided as one example threshold, other embodiments may involve other thresholds such that 20% is but one example of how embodiments may be implemented.

Referring again to FIG. 4, at 420, the segments appearing in selected account names 322s such that the segments satisfy the satisfy the number/frequency threshold are selected by the keyword identifier 341 as a business keyword or keyword associated with business account or business activities, and at 422, the segments can be verified or confirmed as necessary. Step 422 may involve manual review of the selected keywords, e.g., by an administrator, or comparison with an external database (not shown in FIG. 3).

Figure 10:
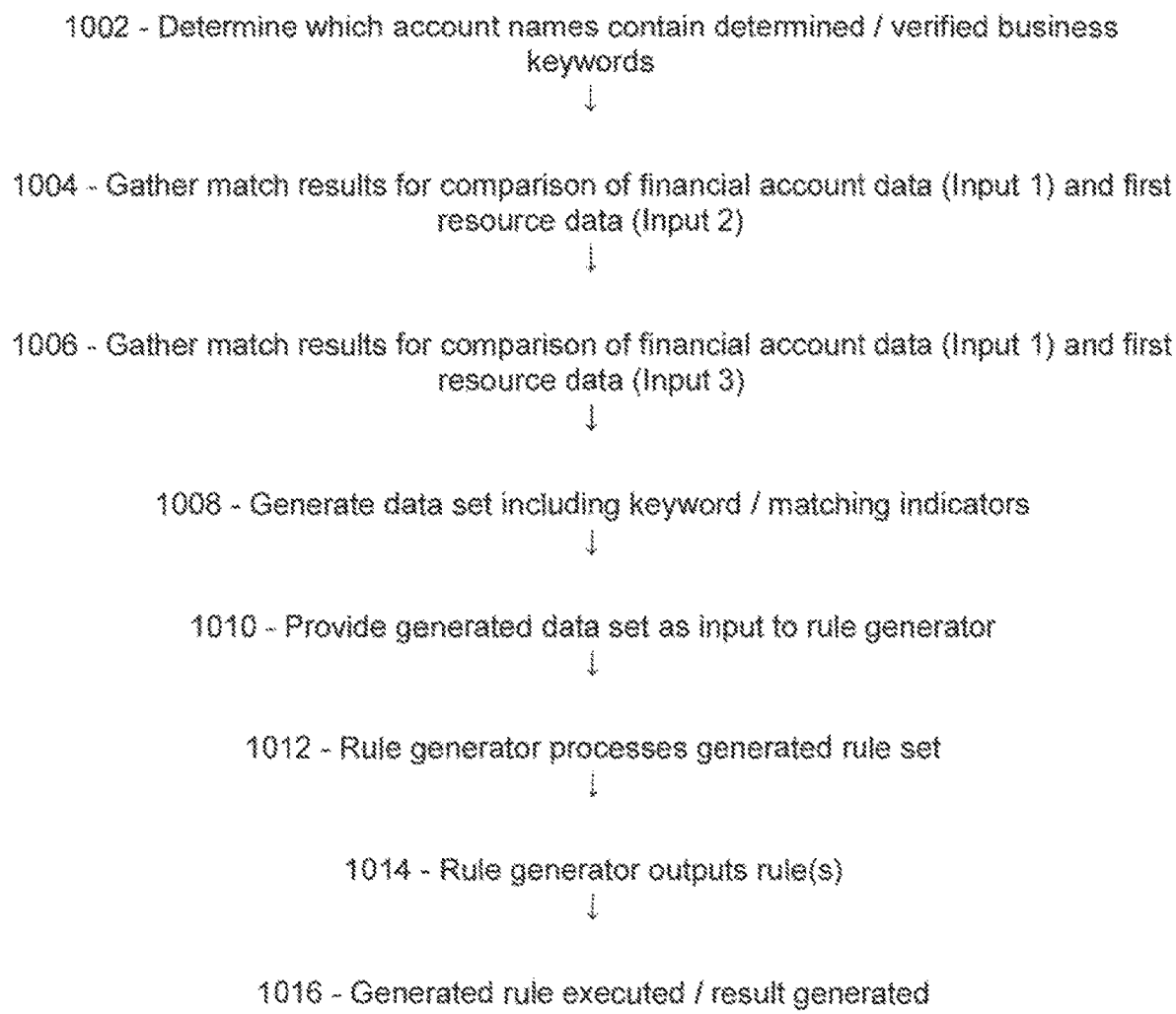
FIG. 10 is a flow diagram of a method for generating a data set and generating rules for use in determining whether an account is a business account or utilized for business purposes.

Referring to FIG. 10, having performing matching analyses and having received keywords 351, or determining keywords 351 according to embodiments as described above, a data set 352 is created by data set generator 343, and will be utilized to generate rules 353. In the illustrated embodiment, the data set 352 is based on the matching analyses that were performed and the keyword determinations.

At 1002, the data set generator 343 determines which account names contain segments that were determined to be business keywords (as shown in FIG. 9), and at 1004 and 1006, gathers results of comparisons that were performed to determine whether financial account data included data that matched data received from at least one data resource 360. Thus, continuing with the example provided above, 1004 may involve the data set generator 343 receiving results of comparisons involving financial account data (Input 1, 501) and first resource 360 data of a FMS such as QUICK-BOOKS business accounting program (Input 2, 502) (e.g., e-mail address), and 1006 may involve the data set generator 343 receiving results of comparisons involving financial account data (Input 1, 501) and first resource data of DUN & BRADSTREET business directory (Input 3, 503 (e.g., mailing addresses)).

At 1008, and with further reference to FIG. 11, a data set 352/1100, which may be in the form of a table of indicators or flags as illustrated, is generated based on the data gathered or received during steps 1002-1006. As shown in FIG. 11, the generated data set 1100 includes columns 1101-1104 for ID, indication data of whether the financial account data (Input 1) matched resource data (Input 2, e-mail address of financial management system), indication data (e.g., "Yes" or "No") of whether the financial account data (Input 1) matched resource data (Input 3, mailing addresses of business directory), and indication data of whether an account name 322 or segment thereof was determined to contain a business keyword 341. Thus, according to one embodiment, the generated data set 352/1100 includes indicators or flags reflecting results of comparisons that were performed as part of that keyword analysis (FIG. 4, steps 402-410), and indicators or flags reflecting results of keyword identification and identification of account names 322 determined to include an identified keyword 341 (FIG. 9).

Figure 12:
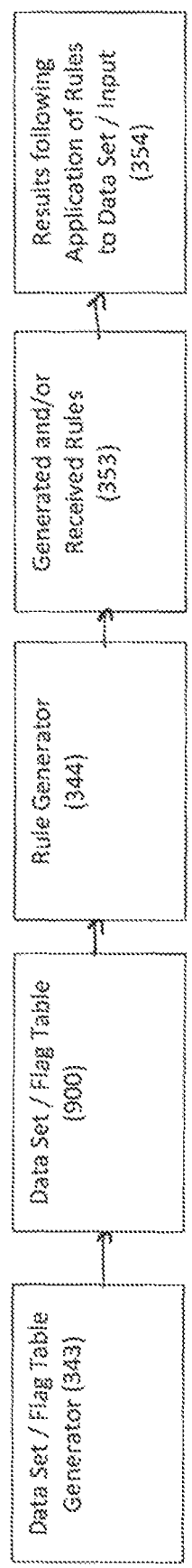
FIG. 12 is a system flow diagram generally illustrating how rules are generated utilizing a data set or flag table.
Figure 13:
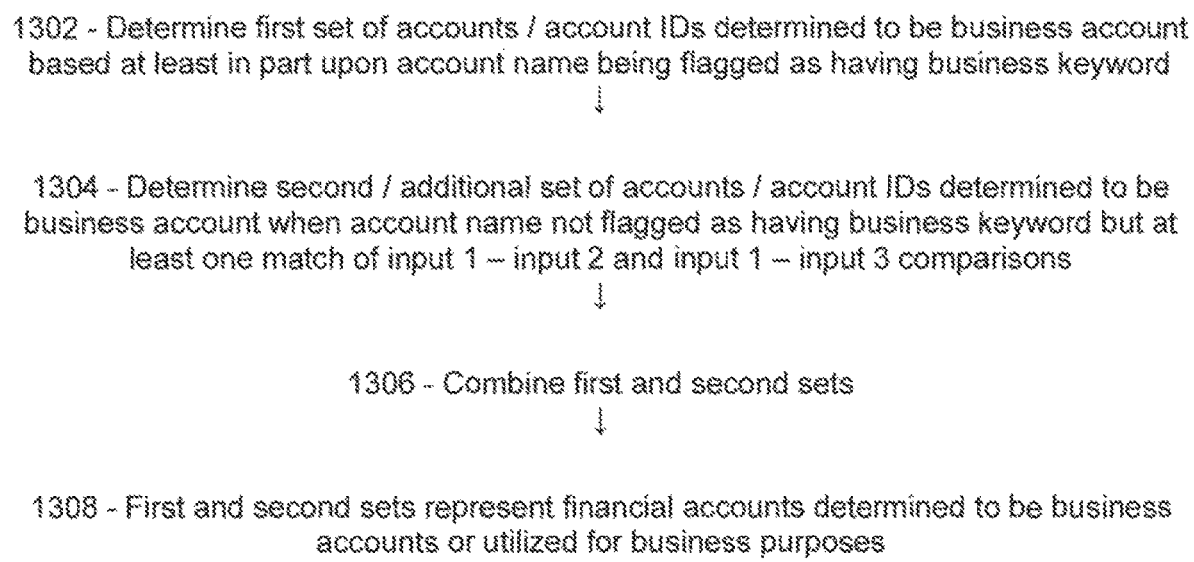
FIG. 13 is a flow diagram of a method for selecting accounts that are business accounts or utilized for business purposes and aggregating selection results generated by application of respective rules.

Referring again to FIGS. 2 and 10, and with further reference to the general system flow diagram of FIG. 12, at 1010, the generated data set 352/1100 is provided as an input to the rule generator 343, or the rule generator 343 processes or trains the data set 352/1100. At 1012, the rule generator 343 processes the generated data set 352/1100 to create or outputs one or more rules 353 at 1014.

According to one embodiment, the rule generator 343 is a rule-based classifier, which is used to train the data set table 253/1100 shown in FIG. 11. In the illustrated example, in which a rule-based classifier is utilized as the rule generator 344, flag_match_input2 (column 1101) and flag_match_input3 (column 1102) are predictor variables, and flag_contain_business_keyword (column 1103) is a class variable. The result or output generated by the rule-based classifier is one or more rules such as Rule 1: if flag_match_input2=Yes=>flag_contain_business_keyword=Yes; Else=>flag_contain_business_keyword=No; Rule 2: if flag_match_input3=Yes=>flag_contain_business_keyword=Yes; Else=>flag_contain_business_keyword=No; and Rule 3: if flag_match_input1=Yes=>flag_contain_business_keyword=Yes; Else=>flag_contain_business_keyword=No.

Thus, "flag_contain_business_keyword=Yes" indicates a business account, but when "flag_contain_business_keyword=No," the account 321 may or may not be a business account depending on the indicator or flag in columns 901 and 902 (as reflected in Rules 2 and 3), e.g., due to some business owners entering their personal names as the account names 322 rather than a business name or business name having segments that would have been identified as business keywords 341. With continuing reference to FIG. 10, at 1016, the one or more generated rules 353 are executed in order to determine whether an account 321 is a business account or utilized for business purposes.

Figure 15:
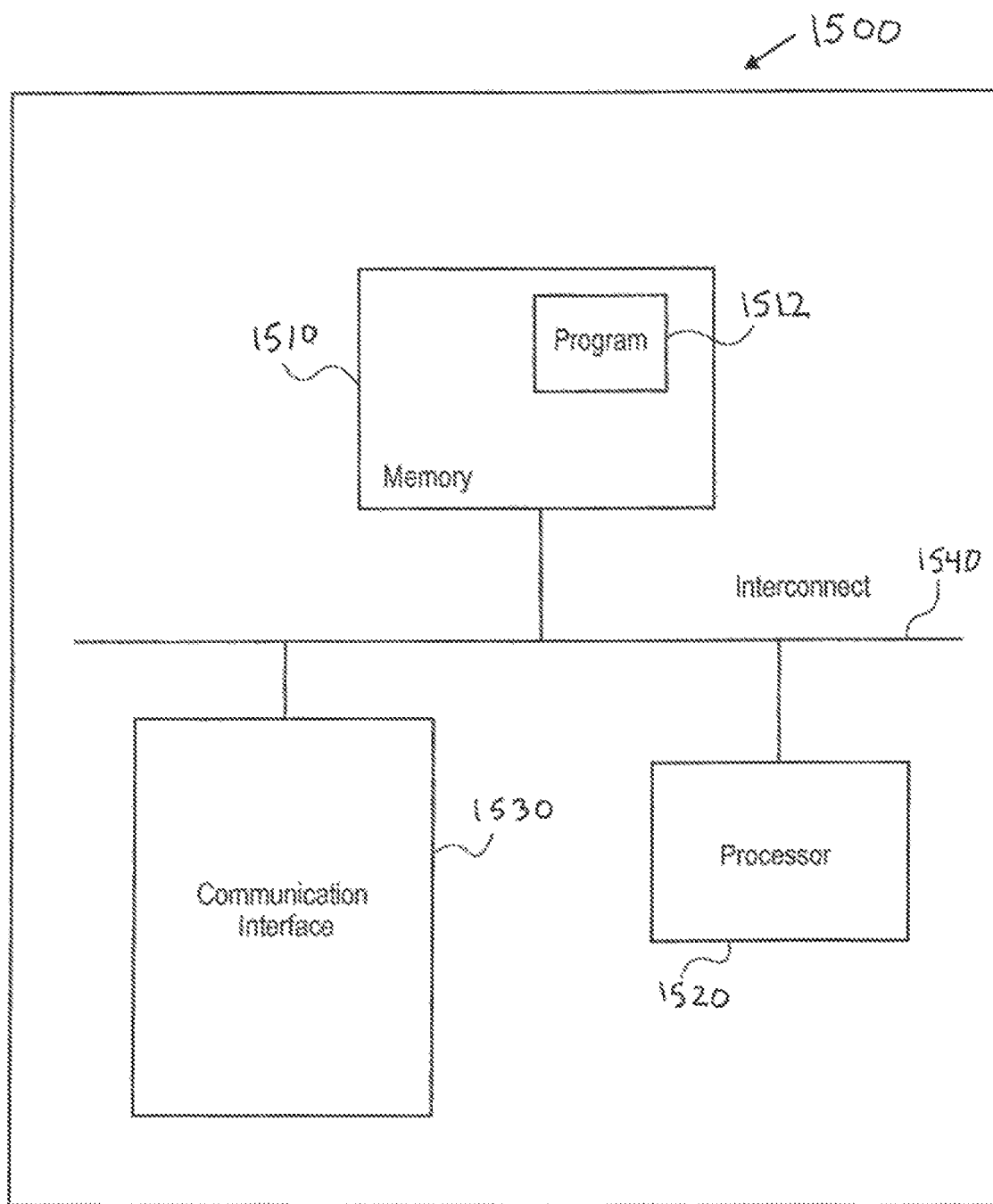
FIG. 15 is a block diagram of a computing apparatus or system in which various embodiments may be implemented or that may be utilized to execute various embodiments.

Referring to FIG. 15, having a set of business keywords 341, a data set 352/1100 or matching flag or indicator table, and rules 353 learned per the rule-based classifier or other rule generator 344, at 1302, the account analyzer 340 determines a first set of accounts 321 or account IDs that are determined to be business account based at least in part upon account name 322 being flagged as having business keyword 341 (as shown in data set 900, column 903). Continuing the above example, accounts 322 identified with Account IDs={3,6,7,8,9} include account names 322 or segments thereof that include or that are business keywords 341 such that these accounts 321 are identified as business accounts or as accounts utilized for business purposes.

Referring again to FIG. 13, at 1304, the account analyzer 340 determines a second/additional set of accounts 321 or account IDs determined to be business accounts or utilized for business purposes when the account name 322 is not flagged as having business keyword 341, but does there is at least one match of input 1-input 2 and input 1-input 3 comparisons.

Referring again to FIG. 9, in the illustrated example, indicators in column 901 show that account names 322 for Account IDs 1, 2, 4, 5, and 10 do not contain a business keyword 341, and of these Account IDs, column 901 indicates a second set including a matching indicator for Account ID 10. Further, in the illustrated example, indicators in column 902 show that of the account names 322 for Account IDs 1, 2, 4, 5, and 10 do not contain a business keyword 341, but a third set including Account ID 1 and 2 include a matching indicator.

Figure 14:
FIG. 14 is a table illustrating results generated by application of rules and selection of accounts identified as business accounts or utilized for business purposes.

Referring again to FIG. 13 and with further reference to FIG. 14, at 1306, the first, second and third sets are combined to form a combined or aggregate set of Account IDs 1, 2, 3, 6, 7, 8, 9 and 10, and at 1308, the combined or aggregate set represents financial accounts 322 determined to be business accounts or utilized for business purposes. FIG. 14 illustrates a table 1400 including columns 1401-1404 for Account ID, Account Name, E-mail Address and Address, and including Account IDs reflecting these results 354.

FIG. 15 generally illustrates certain components of a computing device 1500 that may be utilized to execute embodiments and that includes a memory 1510, program instructions 1512, a processor or controller 1520 to execute instructions 1512, a network or communications interface 1530, e.g., for communications with a network or interconnect 1540 between such components. The memory 1510 may be or include one or more of cache, RAM, ROM, SRAM, DRAM, RDRAM, EEPROM and other types of volatile or non-volatile memory capable of storing data. The processor unit 1520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1540 may include a system bus, LDT, PCI, ISA, or other types of buses, and the communications or network interface may, for example, be an Ethernet interface, a Frame Relay interface, or other interface. The network interface 1530 may be configured to enable a system component to communicate with other system components across a network which may be a wireless or various other networks. It should be noted that one or more components of computing device 1500 may be located remotely and accessed via a network. Accordingly, the system configuration provided in FIG. 15 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1520 performs steps or executes program instructions 1512 within memory 1510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may involve a FI computer embodying the account analyzer so that the FI computer itself performs the processing. In other embodiments, a third party or intermediate host performs the analysis and may then inform the FI of the results.

Further, while certain embodiments have been described with reference to determining keywords and generating rules, embodiments may be directed to determining keywords and/or generating rules for use in identifying business accounts or accounts utilized for business purposes. For example, keywords may be received from a keyword source or database and/or determined according to embodiments, and rules may be received and/or generated according to embodiments. While reference is made to a rule-based classifier, other rule generators may also be utilized. Moreover, it will be understood that the examples discussed in the specification are simplified examples, and that embodiments may be utilized to analyze many more accounts, e.g., thousands, hundreds of thousands and millions of accounts. Further, while embodiments are described with reference to particular types of financial account and resource data, these examples are not intended to be limiting as embodiments may involve some, all or none of the particular types of data described. Further, while embodiments were described with reference to two data resources (one internal or local, and one external or remote), embodiments may involve only internal or local resources, only external or remote resources or a combination, and various numbers of resources may be utilized for comparison and matching analysis, e.g., two, three, five, ten, fifty and other numbers of data resources.

Additionally, while embodiments have been described with reference to certain types of financial account data, other financial account data may be utilized in comparisons, including transaction data of the accounts, and transaction data in combination with other account data including one or more of account name and details about the account holder.

Embodiments may be used to not only identify accounts that are utilized for business purposes, but also to proceed to contact these account owners on behalf of a financial institution regarding possible offerings, account terms and promotions directed to businesses.

Further, it will be understood that embodiments may involve keyword determination, rule generation, the combination of keyword determination and rule generation, the combination of determining keywords and receiving rules to be applied, the combination of receiving keywords to be utilized and generating rules.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method comprising:
    identifying, by an intermediate computer, in communication through respective networks with a computer of a financial institution and respective computers of respective account holders that access respective on-line financial accounts through the intermediate computer, keywords associated with business accounts by:
        receiving electronic on-line financial account data from the computer of the financial institution, first computer resource data of a first computer resource managed by a first host other than the financial institution, the first computer resource data including data identifying one or more financial software users, and second computer resource data of a second computer resource managed by a second host other than the financial institution and different than the first computer resource, the second computer resource data including data identifying one or more business entities;
        performing a first comparison of the electronic on-line financial account data and the first computer resource data to identify at least one first similarity between the electronic on-line financial account data and the first computer resource data,
        performing a second comparison of the electronic on-line financial account data and the second computer resource data to identify at least one second similarity between the electronic on-line financial account data and the second computer resource data,
        selecting online financial account names based at least in part upon the at least one first similarity and the at least one second similarity,
        identifying segments of selected on-line financial account names,
        determining respective segment frequencies within the selected on-line financial account names,
        performing respective comparisons of respective segment frequencies and a pre-determined minimum segment frequency, and
        selecting one or more segments as a keyword based at least in part upon the respective comparisons determining that the selected one or more segments appear within the selected on-line financial account names at frequencies greater than the pre-determined minimum segment frequency;
    generating, by the intermediate computer, an electronic data set comprising:
        respective indicators of whether respective on-line financial account data of a first type includes an identified keyword, and
        respective indicators of respective results of respective comparisons involving respective electronic on-line financial account data of a second type different than the first type; and
    after the electronic data set comprising respective indicators has been generated, the intermediate computer, by executing a computerized rule generator:
        receiving the generated electronic data set as an input; and
        generating a computer-executable rule executable by a processor of the intermediate computer based at least in part upon the input of the generated electronic data set;
    after the computer-executable rule is generated based at least in part upon the input of the generated electronic data set, the intermediate computer, by the computerized account analyzer, evaluating the on-line financial account data against the generated rule to automatically identify at least one on-line financial account that is at least one business account or that is utilized for business purposes; and
    after execution of the computer-executable rule, the intermediate computer transmitting an electronic message to a computing device of an account holder based at least in part upon a result of execution of the computer-executable rule.

2. The method of claim 1, wherein the selecting of the one or more segments as the keyword comprises:
    receiving electronic data of a computerized financial management system managed by a host other than the financial institution;
    comparing electronic on-line financial account data and the computerized financial management system data to determine whether electronic on-line financial account data matches the computerized financial management system data;
    comparing electronic on-line financial account data and the computerized business directory data to determine whether electronic on-line financial account data matches computerized business directory data;
    selecting electronic on-line financial account data comprising account names of those accounts having financial data matching data of at least one of the first and second resources; and
    selecting at least one segment of each selected account name as a keyword.

3. The method of claim 2, the electronic on-line financial account data comprising an account name, an electronic mail address of the account holder and an address of the account holder.

4. The method of claim 3, the computerized financial management system data comprising respective electronic mail addresses of respective registered users of the computerized financial management system.

5. The method of claim 4, the computerized financial management system comprising a business accounting software program utilized by respective registered users to manage accounting matters of respective registered users.

6. The method of claim 5, the method being performed by an intermediate computer hosting the business accounting software program, the intermediate computer being in communication with a computer of the financial institution and a computer hosting the computerized business directory.

7. The method of claim 3, the computerized business directory data comprising respective addresses of business entities included in the computerized business directory.

8. The method of claim 3, the electronic on-line financial account data comprising an account name, an electronic mail address and a mailing address of the account holder, the computerized financial management system data comprising respective electronic mail addresses of respective registered users of the computerized financial management system, and the computerized business directory comprising respective mailing addresses of respective business entities included in the computerized business directory.

9. The method of claim 1, the minimum threshold frequency comprising the segment appearing within at least about 20% of the account names.

10. The method of claim 1, the computerized rule generator comprising a rule-based classifier.

11. The method of claim 1, the generated electronic data set that is an input to the computerized rule generator comprising:
- a first indicator whether a first comparison involving electronic on-line financial account data and data of a first computer resource resulted in a match;
- a second indicator whether a second comparison involving electronic on-line financial account data and data of a second computer resource resulted in a match; and
- a third indicator whether electronic on-line financial account data includes a keyword associated with business accounts.

12. The method of claim 11, the first indicator and the second indicator comprising respective first and second predictor variables, and the third indicator comprising a class variable.

13. The method of claim 11, the first resource comprising a computerized financial management system and the second resource comprising a computerized business directory.

14. The method of claim 13, the computerized financial management system comprising a business accounting software program utilized by respective registered users to manage accounting matters of respective registered users.

15. The method of claim 14, the first comparison involving comparison of electronic financial account data comprising respective electronic mail addresses of respective account holders and respective electronic mail addresses of respective registered users of the computerized financial management system.

16. The method of claim 13, the computerized business directory comprising respective addresses of business entities included in the computerized business directory.

17. The method of claim 13, the second comparison involving comparison of electronic financial account data comprising respective addresses of respective account holders and respective addresses of respective business entities within the computerized business directory.

18. The method of claim 11, wherein the on-line financial account is identified as a business account or utilized for business purposes by the computerized account analyzer when the third indicator indicates that the electronic online financial account data includes a keyword associated with business accounts.

19. The method of claim 11, wherein the on-line financial account is identified by the computerized account analyzer as a business account or utilized for business purposes when the third indicator indicates that the electronic online financial account data does not include a keyword associated with business accounts, and at least one of the first and second indicators indicates a match.

20. The method of claim 11, wherein the on-line financial account is not identified as a business account or utilized for business purposes by the computerized account analyzer when the third indicator indicates that the electronic online financial account data does not include a keyword associated with business accounts, and neither the first indicator nor the second indicator indicates a match.

21. The method of claim 1, the generated electronic data set that is an input to the computerized rule generator comprising:
- indicators of whether a first type of electronic on-line financial account data includes an identified keyword, and
- indicators of results of respective comparisons involving a second type of electronic financial account data different than the first type.

22. The method of claim 21, the generated electronic data set that is an input to the computerized rule generator comprising:
- indicators of results of respective comparisons involving a third type of on-line financial account data different than the first type and the second type.

23. The method of claim 21, the first type comprising an account name, and the second type comprising contact information of the account holder.

24. The method of claim 23, the contact information comprising an electronic mail address of the account holder.

25. The method of claim 23, the contact information comprising a mailing or post office box address of the account holder.

26. The method claim 23, the contact information comprising at least one of a telephone number, a cellular telephone number, and a facsimile number of the account holder.

27. The method of claim 1, the indicators comprising a "yes" indicator and a "no" indicator.

* * * * *